US012638654B2

(12) United States Patent
Chambers et al.

(10) Patent No.: US 12,638,654 B2
(45) Date of Patent: May 26, 2026

(54) ELECTRONIC DEVICES WITH ADJUSTABLE EYE RELIEF

(71) Applicant: Apple Inc., Cupertino, CA (US)

(72) Inventors: Trevor S Chambers, San Diego, CA (US); Ivan S Maric, Campbell, CA (US); Matin Seadat Beheshti, Sunnyvale, CA (US); Aidan N Zimmerman, Poway, CA (US); Shannon Pomeroy, San Francisco, CA (US); Blake N Trekell, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 18/347,271

(22) Filed: Jul. 5, 2023

(65) Prior Publication Data

US 2025/0013000 A1 Jan. 9, 2025

(51) Int. Cl.
G02B 7/02        (2021.01)
G02B 27/00       (2006.01)
G06F 1/16        (2006.01)
(52) U.S. Cl.
CPC ............. G02B 7/023 (2013.01); G06F 1/163 (2013.01); G02B 27/0093 (2013.01)
(58) Field of Classification Search
CPC ............ G02B 27/0176; G02B 27/0172; G02B 27/017; G02B 27/0093; G02B 27/0149; G02B 27/0101; G02B 27/0081; G02B 27/0179; G06F 3/013
See application file for complete search history.

(56) References Cited

U.S. PATENT DOCUMENTS

| | | | |
|---|---|---|---|
| 9,001,427 B2 | 4/2015 | Jacobs et al. | |
| 10,133,305 B1 | 11/2018 | Sullivan et al. | |
| 10,905,186 B2 | 2/2021 | Chang et al. | |
| 11,067,813 B2 | 7/2021 | Chang et al. | |
| 11,454,779 B1* | 9/2022 | Fang ................... | G02B 27/0093 |
| 2018/0092796 A1* | 4/2018 | Park .......................... | A61B 3/09 |
| 2019/0072772 A1 | 3/2019 | Poore et al. | |
| 2022/0099910 A1* | 3/2022 | Chang ..................... | G06F 1/163 |
| 2025/0113459 A1* | 4/2025 | Otsuka .................... | G06F 1/163 |

* cited by examiner

*Primary Examiner* — Ephrem Z Mebrahtu
(74) *Attorney, Agent, or Firm* — Treyz Law Group, P.C.; David K. Cole

(57) ABSTRACT

A head-mounted device may include optical assemblies for presenting images to a user. Each optical assembly may have a support with first and second portions that move relative to each other. A motor in each optical assembly may move the second portion of that optical assembly relative to the first portion of that optical assembly. The optical assemblies may each have guide rods along which the second portion of the optical assembly slides relative to the first portion. A lens in each optical assembly may be used to convey an image from a display in the optical assembly to an eye box for viewing by a user. The lens and display may be mounted to the second portion. Face bumpers may be mounted to the first portion. To adjust eye relief, the motor of each optical assembly may move the second portion relative to the first portion.

18 Claims, 9 Drawing Sheets

ELECTRONIC DEVICES WITH ADJUSTABLE EYE RELIEF

FIELD

This relates generally to electronic devices, and, more particularly, to electronic devices such as head-mounted devices.

BACKGROUND

Electronic devices have components such as displays and lenses. It can be challenging to customize such devices for different users.

SUMMARY

A head-mounted device may include optical assemblies for presenting images to a user. Each optical assembly may have a support with first and second portions that move relative to each other. A motor in each optical assembly may move the second portion of the optical assembly relative to the first portion of the optical assembly. The optical assemblies may each have guide rods along which the second portion of the optical assembly slides relative to the first portion.

A lens in each optical assembly may be used to convey an image from a display in the optical assembly to an eye box for viewing by a user. The lens and display may be mounted to the second portion. Face bumpers may be mounted to the first portion. To adjust eye relief, the motor of each optical assembly may move the second portion relative to the first portion. This moves the lens and display attached to the second portion relative to the face bumpers attached to the first portion.

DETAILED DESCRIPTION

Electronic devices such as head-mounted devices may have displays for displaying images and lenses that are used in presenting the images to eye boxes for viewing by a user. Different users have different spacings between their eyes, which are sometimes referred to as interpupillary distances. To accommodate users with different interpupillary distances, a head-mounted device may be provided with movable optical assemblies.

Figure 1:
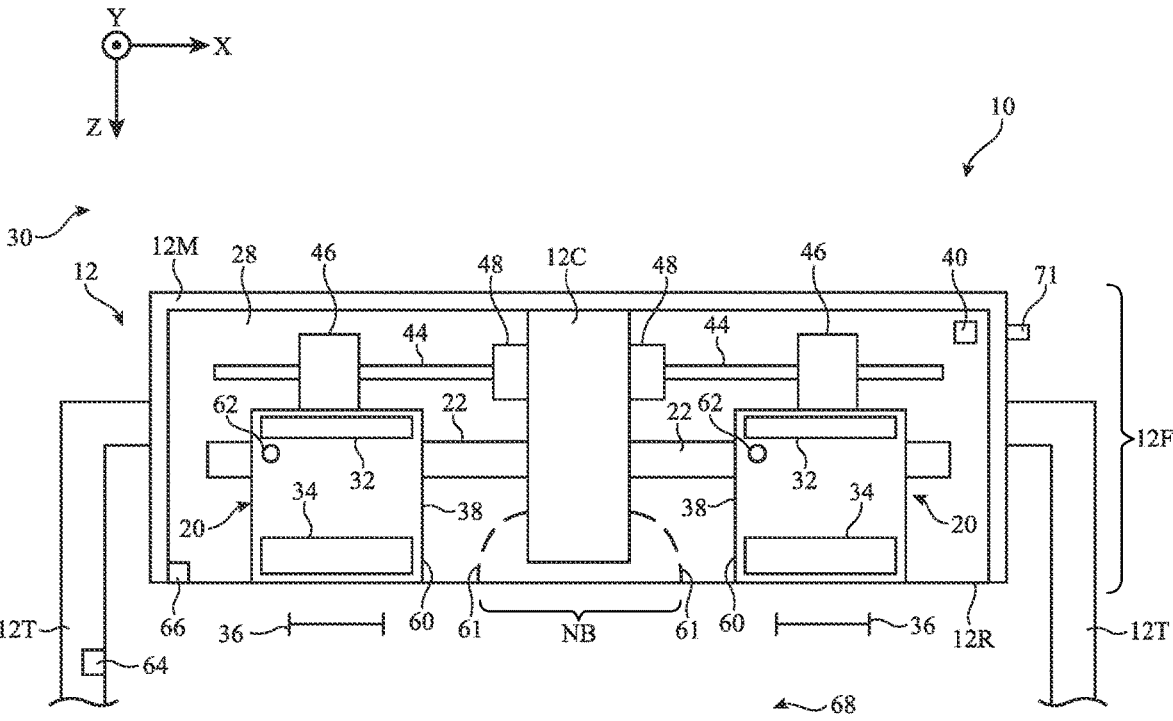
FIG. 1 is a diagram of an illustrative head-mounted device in accordance with an embodiment.

FIG. 1 is a schematic diagram of an illustrative electronic device of the type that may include movable optical assemblies to accommodate different interpupillary distances. Device 10 of FIG. 1 may be a head-mounted device (e.g., goggles, glasses, a helmet, and/or other head-mounted device). In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure, head-mounted housing, or head-mounted support). Housing 12 may include a front portion such as front portion 12F and a rear portion such as rear portion 12R. When device 10 is worn on the head of a user, rear portion 12R rests against the face of the user and helps block stray light from reaching the eyes of the user and nose bridge portion NB of housing 12 rests on the nose of the user.

Main portion 12M of housing 12 may be attached to head strap 12T. Head strap 12T may be used to help mount main portion 12 on the head and face of a user. Main portion 12M may have a rigid shell formed from housing walls of polymer, glass, metal, and/or other materials. When housing 12 is being worn on the head of a user, the front of housing 12 may face outwardly away from the user, the rear of housing 12 (and rear portion 12R) may face towards the user. In this configuration, rear portion 12R may face the user's eyes located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel, optical module support, lens support, lens and display support, support, or support structure) and guide rods 22 (sometimes referred to as guide rails 22) along which optical assemblies 20 may slide to adjust optical-assembly-to-optical-assembly separation to accommodate different user interpupillary distances.

Each assembly 20 may have a display 32 that has an array of pixels for displaying images and a lens 34. Lens 34 may optionally have a removable vision correction lens for correcting user vision defects (e.g., refractive errors such as nearsightedness, farsightedness, and/or astigmatism). In each assembly 20, display 32 and lens 34 may be coupled to and supported by support 38. During operation, images displayed by displays 32 may be presented to eye boxes 36 through lenses 34 for viewing by the user.

Rear portion 12R may include flexible structures (e.g., a flexible polymer layer, a flexible fabric layer, and/or other flexible housing structures) so that portion 12R can stretch to accommodate movement of supports 38 toward and away from each other to accommodate different user interpupillary distances. These flexible portions may sometimes be referred to as a curtain, stretchable fabric curtain, etc.

The walls of housing 12 may separate interior region 28 within device 10 from exterior region 30 surrounding device 10. In interior region 28, optical assemblies 20 may be mounted on guide rods 22. Guide rods 22 may be attached to central housing portion 12C. If desired, the outer ends of guide rods 22 may be unsupported (e.g., the outer end portions of rods 22 may not directly contact housing 12, so that these ends float in interior region 28 with respect to housing 12).

Device 10 may include control circuitry and other components such as components 40. The control circuitry may include storage, processing circuitry formed from one or more microprocessors and/or other circuits. The control circuitry may be used to control any adjustable components in device 10 such as motors, actuators, displays, light-emitting components, audio components, etc. To support communications between device 10 and external equipment, the control circuitry may include wireless communications circuitry. Components 40 may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, current sensors, voltage sensors, and/or other sensors. In some arrangements, device 10 may use sensors to gather user input (e.g., button press input, touch input, etc.). Sensors may also be used in gathering environmental motion (e.g., device motion measurements, temperature measurements, ambient light readings, etc.).

Optical assemblies 20 may have gaze trackers 62 (sometimes referred to as gaze tracker sensors). Gaze trackers 62, which may operate through lenses 34, may include one or more light sources such as infrared light-emitting diodes that emit infrared light to illuminate the eyes of a user in eye boxes 36. Gaze trackers 62 also include infrared cameras for capturing images of the user's eyes and measuring reflections (glints) of infrared light from each of the infrared light sources. By processing these eye images, gaze trackers 62 may track the user's eyes and determine the point-of-gaze of the user. Gaze trackers 62 may also measure the locations of the user's eyes (e.g., the user's eye relief and the user's interpupillary distance).

To accommodate users with different interpupillary distances (eye-to-eye spacings), the spacing between the left and right optical assemblies 20 in device 10 can be adjusted (e.g., to match or nearly match the user's measured interpupillary distance). Device 10 may have left and right actuators (e.g., motors) such as motors 48. Each motor 48, which may include internal gears, may be used to rotate an elongated threaded shaft (screw) such as shaft 44. A nut 46 is provided on each shaft 44. The nut, which may, if desired, be formed from part of support 38, has threads that engage the threads on that shaft 44. When a shaft is rotated, the nut on the shaft is driven in a +X or –X direction (in accordance with whether the shaft is being rotated clockwise or counterclockwise). In turn, this moves the optical assembly 20 that is attached to the nut in the +X or –X direction along its optical assembly guide rod 22. Each assembly 20 (e.g., support 38) may have portions that receive one of guide rods 22 so that the assembly is guided along the guide rod. By controlling the activity of motors 48, the spacing between the left and right optical assemblies of device 10 may be changed so that interpupillary distance adjustments can be made to device 10 to accommodate the interpupillary distances of different users. For example, if a user has closely spaced eyes, assemblies 20 may be moved inwardly (towards each other and towards nose bridge portion NB of housing 12) and if a user has widely spaced eyes, assemblies 20 may be moved outwardly (away from each other).

When device 10 is being worn by a user, the user's head is located in region 68. The presence of the user's head (and therefore a determination of whether device 10 is being worn or is unworn) may be made using one or more sensors (e.g., gaze trackers 62, which may detect the presence of the eyes of the user in eye boxes 36, rear-facing sensors such as sensor 66 on main housing 12M, head-facing sensors mounted on strap 12T such as sensor 64, and/or other head presence sensors). These sensors may include cameras, light sensors (e.g., visible light or infrared sensors that measure when ambient light levels have dropped due to shadowing by the head of a user), proximity sensors (e.g., sensors that emit light such as infrared light and that measure corresponding reflected light from a user's head with an infrared light sensor, capacitive proximity sensors, ultrasonic acoustic proximity sensors, etc.), switches and/or other force-sensing sensors that detect head pressure when a user's head is present, and/or other head presence sensors.

Output from head presence sensors and/or output from gaze trackers 62 may be used in controlling motors 48 to automatically adjust the spacing of optical assemblies 20. Optical assembly spacing may also be adjusted manually (e.g., by controlling motors 48 using a button such as button 71).

Figure 2:
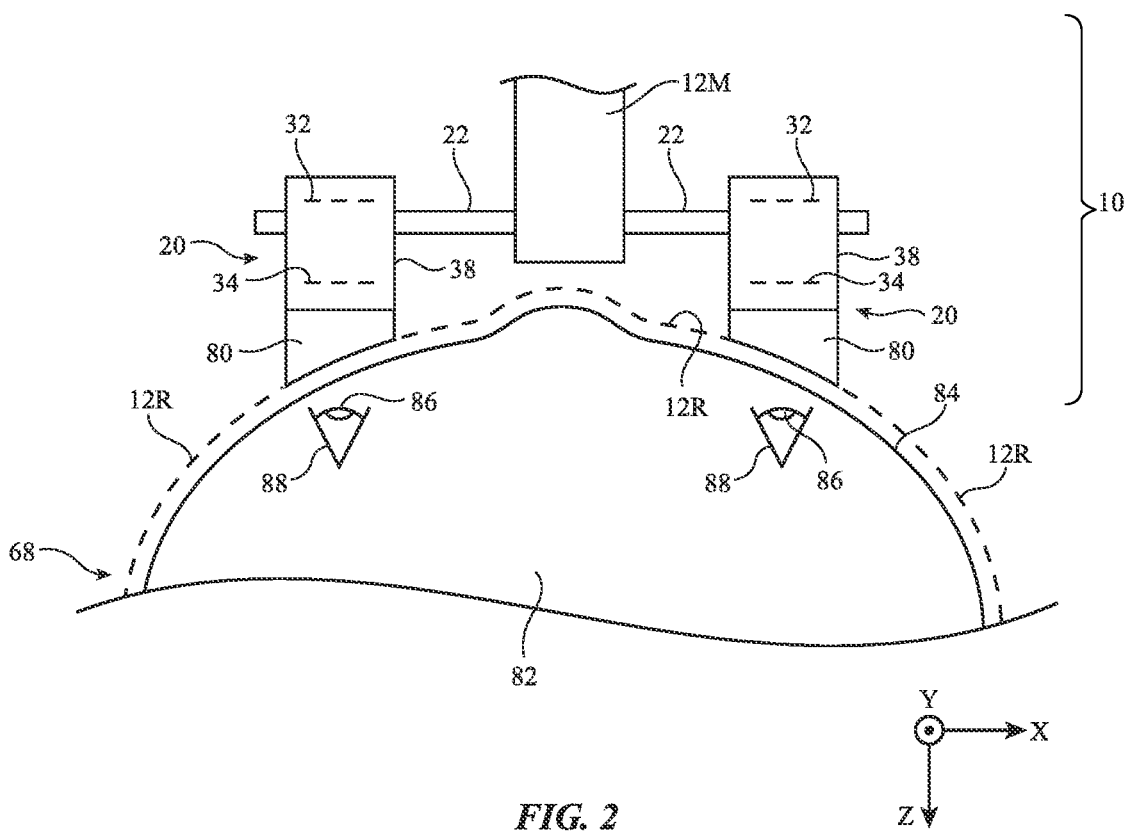
FIG. 2 is a top view a portion of an illustrative head-mounted device adjacent to a user's head in accordance with an embodiment.

FIG. 2 is a top view of optical assemblies 20 in device 10 in an illustrative arrangement in which device 10 is being worn on the head of a user. As shown in FIG. 2, when the user's head 82 is present in region 68, the user's face (face 84) faces optical assemblies 20 and may rest against rear portion 12R (e.g., a cushioned flexible portion of the rear of housing 12). The user has left and right eyes 88 with eye lenses 86. Eyes 88 are located in eye boxes 36 (FIG. 1) and view images generated by displays 32 through lenses 34. For satisfactory viewing, lenses 34 are located at a desired eye relief distance (ER) from eye lenses 86. If lenses 34 are too far away from eye lenses 86, eye relief will be larger than desired and the user's field of view when viewing images from displays 32 may be undesirably reduced.

Cushioning structures such as face bumpers 80 may be mounted on supports 38 in optical assemblies 20. During normal use of device 10, bumpers 80 may be separated by a small gap from the face of the user. In the event of an unexpected fall or other accident, device 10 may contact the ground or other rigid surface, thereby creating forces that drive optical assemblies 20 and lenses 34 toward the user. Due to the presence of bumpers 80, optical assemblies 20 and lenses 34 will be prevented from moving towards eyes 88 and eye lenses 86 by more than a predetermined amount.

Figure 3:
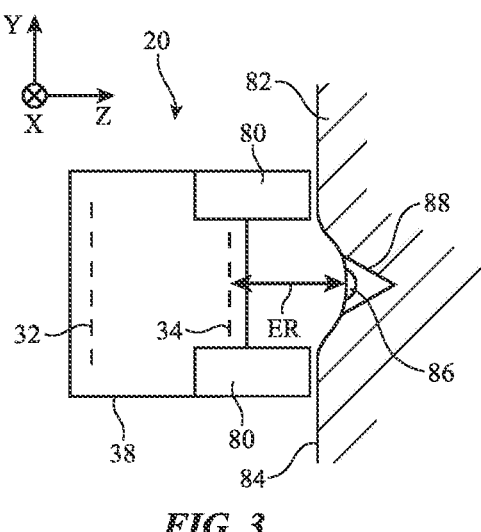
FIG. 3 is a cross-sectional view of an illustrative optical assembly adjacent to the head of a user with shallowly set eyes in accordance with an embodiment.
Figure 4:
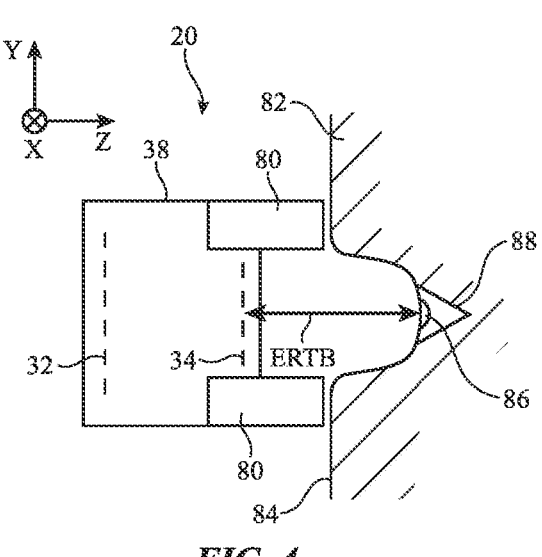
FIG. 4 is a cross-sectional view of the optical assembly of FIG. 3 adjacent to the head of a user with deeply set eyes in accordance with an embodiment.

FIGS. 3 and 4 illustrate a challenge that may be associated with adjusting the eye relief of optical assemblies 20 when bumpers 80 are present. In FIG. 3, optical assembly 20 is being used by a user with shallowly set eyes. In this user, a satisfactory eye relief distance (eye relief ER) may be established between lens 34 of optical assembly 20 and lens 86 of eye 88. However, when optical assembly 20 of FIG. 3 is used by a user with deeply set eyes, it is no longer possible for eye relief ER to be achieved, because the presence of bumpers 80 will prevent lens 34 from being moved closer towards the user's face. This is illustrated in FIG. 4. In the example of FIG. 4, optical assembly 20 of FIG. 3 has been placed adjacent to the face 84 of a user with deeply set eyes. Due to the presence of bumpers 80 and the deeply set eyes of the user, the minimum eye relief achievable with optical assembly 20 of FIG. 4 is ERTB, which is larger than desired eye relief value ER. The larger than desired eye relief value of ERTB may cause the user of FIG. 4 to experience a restricted field-of-view when viewing images on display 32.

Figure 5:
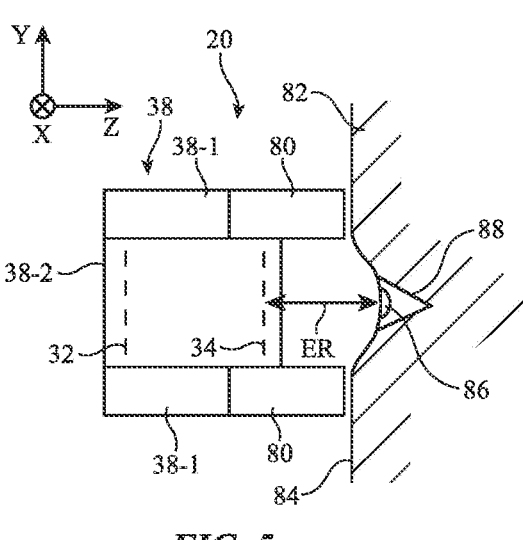
FIG. 5 is a cross-sectional view of an illustrative telescoping optical assembly in a retracted configuration being used by a user with shallowly set eyes in accordance with an embodiment.
Figure 6:
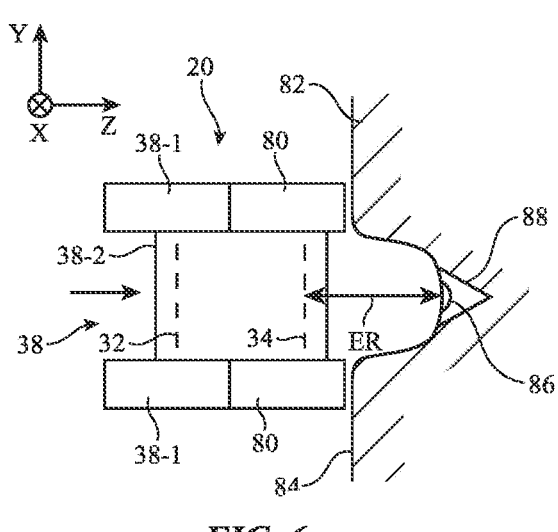
FIG. 6 is a cross-sectional view of the illustrative telescoping optical assembly of FIG. 5 in an extended configuration being used by a user with deeply set eyes in accordance with an embodiment.

Illustrative optical assembly 20 of FIGS. 5 and 6 avoids this situation using a telescoping design. Unlike support 38 of FIGS. 3 and 4, support 38 of optical assembly 20 of FIGS. 5 and 6 has multiple portions that can move with respect to each other. In particular, support 38 of FIGS. 5 and 6 includes first portion 38-1 and second portion 38-2. Second portion 38-2 carries display 32 and lens 34 and can extend and retract relative to first portion 38-1. In the configuration of FIG. 5, optical assembly 20 is being used for a user with shallowly set eyes, so portion 38-2 is retracted into portion 38-1 away from eye lens 86. This moves lens 34 in the −Z direction relative to bumpers 80 and establishes sufficient eye relief between eye lens 86 and lens 34 (e.g., desired eye relief value ER) for satisfactory viewing of images from display 32. In the configuration of FIG. 6, optical assembly 20 of FIG. 5 is being used for a user with deeply set eyes, so portion 38-2 is extended from portion 38-1 towards eye lens 86. This moves lens 34 in the +Z direction relative to bumpers 80 and ensures that the eye relief between eye lens 86 and lens 34 is not more than desired. In the example of FIG. 6, the telescoping movement of portion 38-2 is able to reduce the separation between lens 86 and lens 34 to the same eye relief value (eye relief ER) as in the example of FIG. 5, even though the user's eyes in FIG. 6 are more deeply set than in FIG. 5. As a result, the field-of-view of the user in FIG. 6 will not be restricted due to excessive eye relief.

Figure 7:
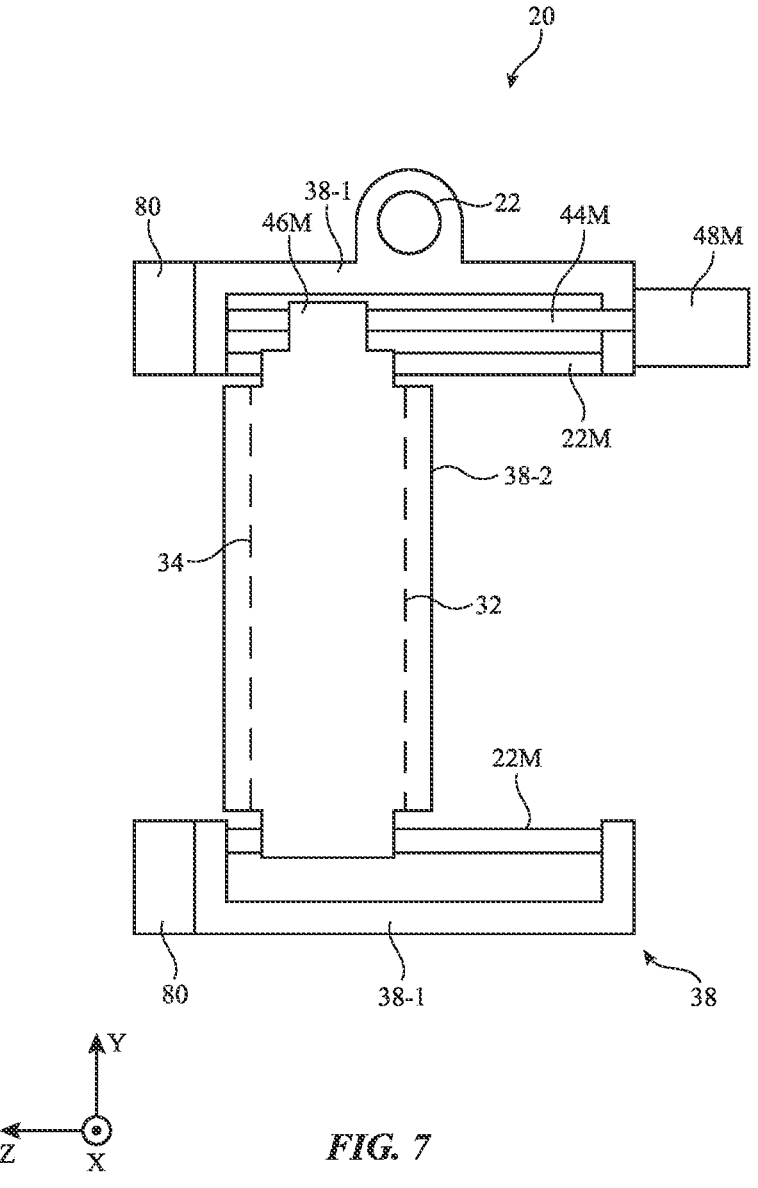
FIG. 7 is a cross-sectional side view of an illustrative telescoping optical assembly in accordance with an embodiment.

FIG. 7 is a cross-sectional side view of an illustrative telescoping optical assembly. In the configuration of FIG. 7, optical assembly 20 has a telescoping support structure 38, which includes first support portion 38-1 and second support portion 38-2. First support portion 38-1 has an opening that receives guide rod 22, which allows assembly 20 to be moved parallel to the X axis for interpupillary distance adjustments, as described in connection with optical assemblies 20 of FIG. 1. Upper and lower guide rods 22M are attached to portion 38-1. Second portion 38-2 slides on guide rods 22M relative to first portion 38-1, which allows second portion 38-2 to extend and retract to accommodate different users (e.g., users with shallowly set eyes and users with deeply set eyes). Portion 38-2 may have a nut or other threaded portion such as portion 46M that receives threaded shaft (leadscrew) 44M. Motor 48M on portion 38-1 rotates shaft 44M to move portion 46M and therefore portion 38-2 along the Z axis. Bumpers 80 are attached to portion 38-1, whereas lens 34 and display 32 are attached to portion 38-2. Accordingly, movement of portion 38-2 relative portion 38-1 using motor 48M causes lens 34 to move relative to bumpers 80 to accommodate users with both shallowly set and deeply set eyes, as described in connection with FIGS. 5 and 6.

Figure 9:
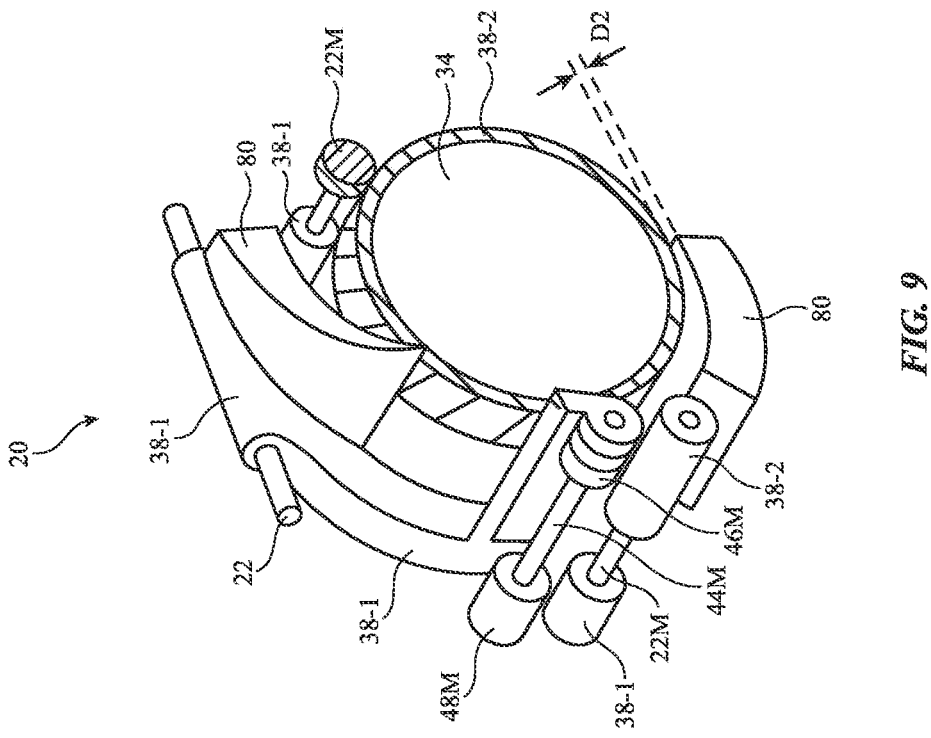
FIGS. 8 and 9 are perspective views of an illustrative telescoping optical assembly in respective retracted and extended configurations in accordance with embodiments.
Figure 8:
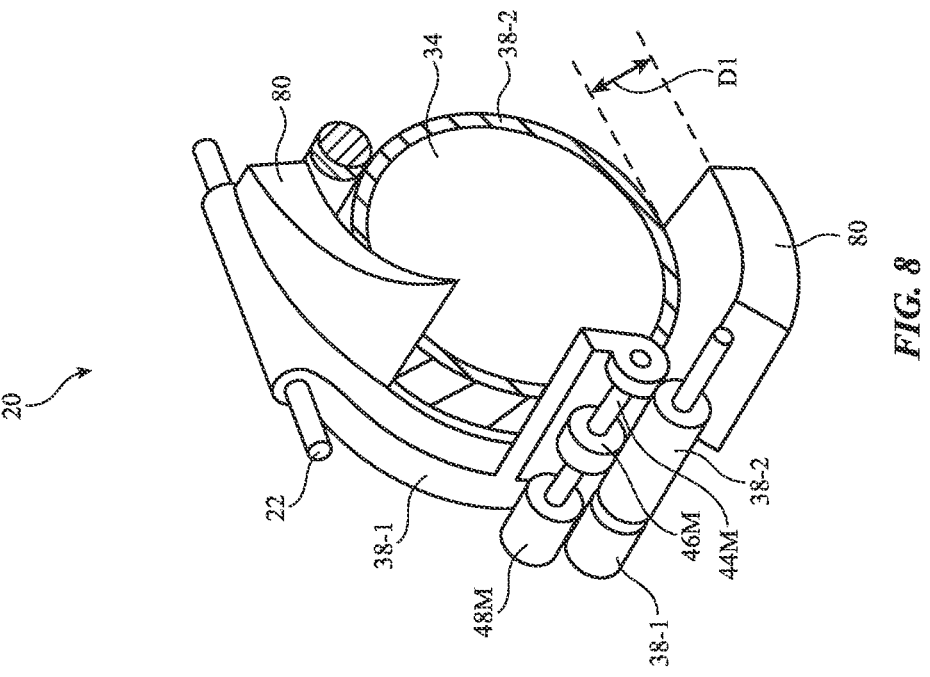

FIGS. 8 and 9 are perspective views of an illustrative telescoping optical assembly. In FIG. 8, portion 38-2 has been retracted relative to portion 38-1 and bumpers 80 to accommodate a user with a shallowly set eyes. As shown in FIG. 8, this causes lens 34 to be located a distance D1 from the outermost surface of lower bumper 80. In FIG. 9, portion 38-2 has been extended relative to portion 38-1 and bumpers 80 to accommodate a user with deeply set eyes. As shown in FIG. 9, this reduces the distance between lens 34 and the outermost surface of lower bumper 80 to a value of D2, which is less than D1. FIGS. 8 and 9 show how bumpers 80 may have curved exterior surfaces facing the user. The curved exterior surfaces may be configured to match corresponding curved facial shapes (e.g., curved surfaces on the portions of the user's face to be contacted by bumpers 80).

If desired, the Z axis position of optical assemblies 20 can be adjusted by mounting central portion 12C of housing 12 on guide rods attached to remaining portions of housing 12 (e.g., main housing portion 12M). This type of arrangement is shown in FIGS. 10 and 11.

Figure 10:
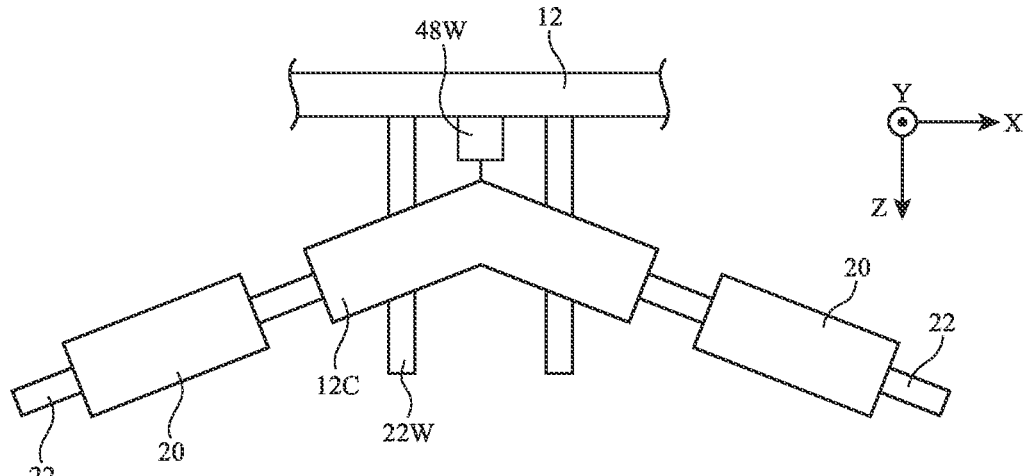
FIGS. 10 and 11 are cross-sectional top views of illustrative head-mounted devices with movable optical assemblies in accordance with an embodiment.

In the example of FIG. 10, guide rods 22W have been attached to housing 12. Central portion 12C of housing 12 has openings that receive guide rods 22W for sliding motion relative to the remainder of housing 12. This allows the position of central portion 12C to be moved back and forth along guide rods 22W parallel to the Z axis by one or more motors and leadscrews or other suitable actuator (see, e.g., illustrative actuator 48Z mounted to housing 12 in the FIG. 10 example). Interpupillary distance adjustment guide rods 22 and optical assemblies 20 travel with central portion 12C.

Figure 11:
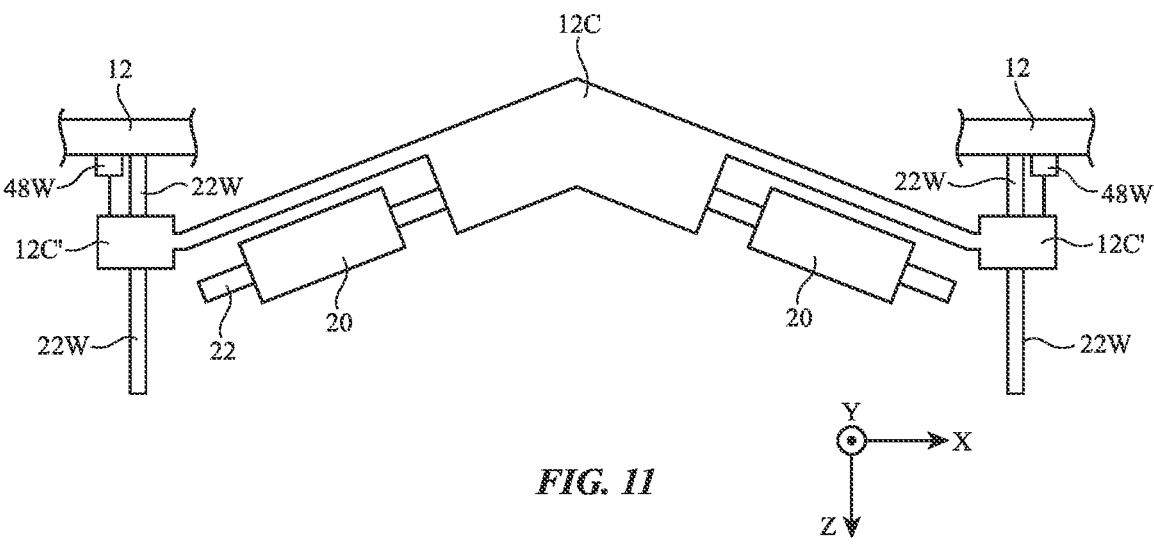

In the example of FIG. 11, guide rods 22W have again been attached to housing 12. Central portion 12C of housing 12 of FIG. 11 has wings 12C with openings that receive guide rods 22W for sliding motion. This allows the position of central portion 12C to be moved back and forth along guide rods 22W parallel to the Z axis by one or more motors and leadscrews or other suitable actuator or actuators (see, e.g., illustrative actuators 48Z mounted to housing 12 in the FIG. 11 example). Interpupillary distance adjustment guide rods 22 and optical assemblies 20 travel with central portion 12C.

The examples of FIGS. 10 and 11 illustrate how optical assemblies 20 can be repositioned along the Z axis to adjust eye relief. These examples also illustrate how central portion 12C and guide rods 22 may be configured in a wishbone arrangement to accommodate the curvature of the user's face. This type of wishbone arrangement in which guide rods 22 are angled slightly relative to the X axis may also be used in device 10 of FIG. 1 (e.g., a device with telescoping supports 38).

Figure 12:
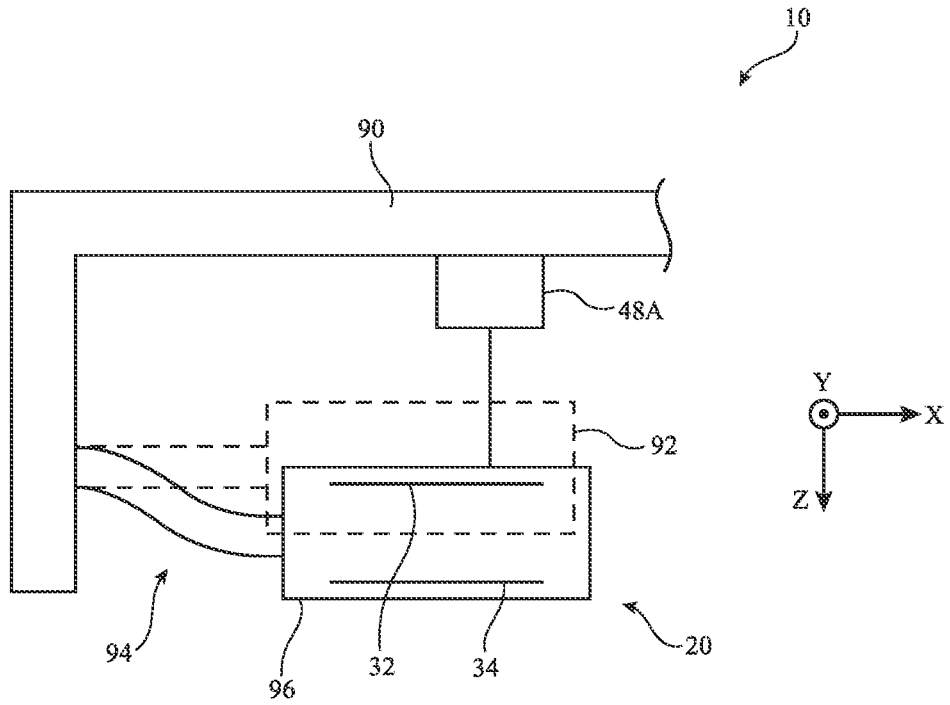
FIG. 12 is a cross-sectional top view of an illustrative optical assembly mounted to a flexure to allow the position of the optical assembly to be adjusted in accordance with an embodiment.

If desired, a flexure may be used for mounting optical assembly 20 to housing 12 or for moving portions of optical assembly 20 relative to each other, as shown in FIG. 12. With this type of arrangement, when it is desired to use actuator 48A to move some or all of optical assembly 20 along the Z axis to adjust eye relief, flexure 94 bends (flexes), thereby allowing display 32 and lens 34 to move relative to structure 90 (e.g., from initial position 92 to the position shown in FIG. 12).

Structure 90 may be formed from a part of housing 12 or may be formed from a portion of an optical assembly support structure. In an arrangement in which structure 90 is formed from housing 12, flexure 94 allows assembly 20 (and lens and display support 96) to move in its entirety relative to housing 12. In an arrangement in which structure 90 is formed from part of an optical assembly support, the support may have a first portion (structure 90) that is mounted on one of guide rods 22 (or is attached to housing 12 in a configuration in which no guide rods 22 are present) and may have a second portion that forms support structure 96 to carry display 32 and lens 34. When it is desired to adjust eye relief in this type of arrangement, actuator 48A moves structure 96 along the Z axis.

Figure 13A:
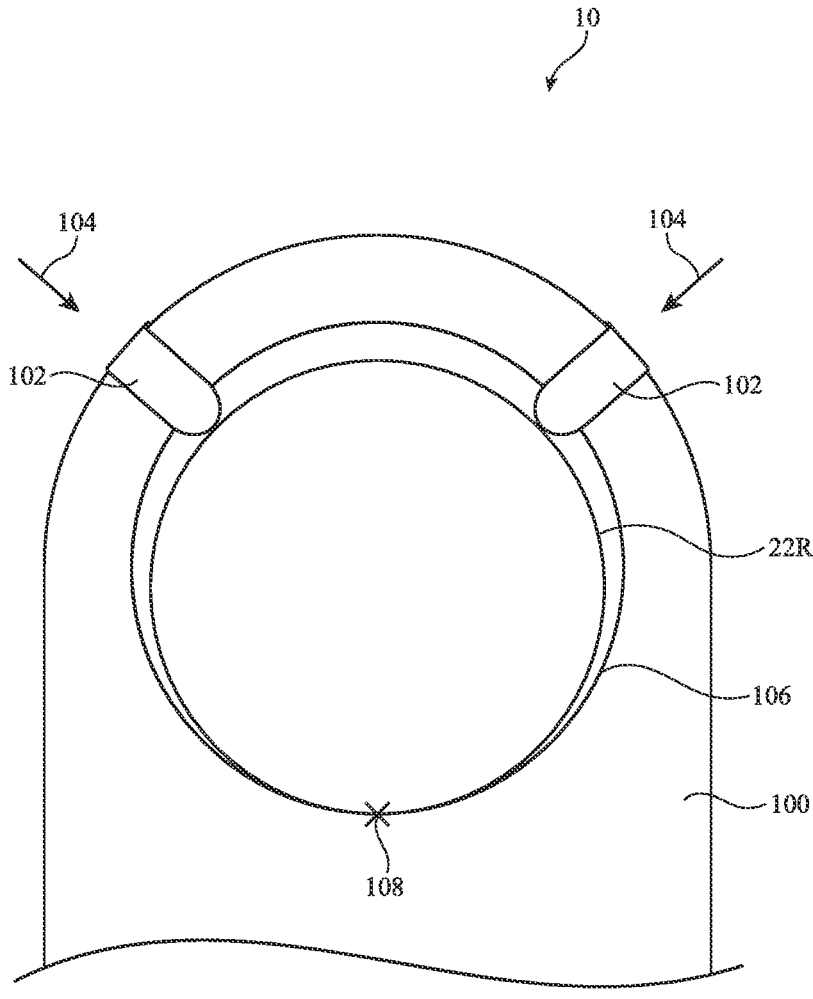
FIGS. 13A and 13B are cross-sectional views of guide rods in openings in portions of a head-mounted device in arrangements where springs are used to place the guide rods in desired positions within the openings in accordance with embodiments.
Figure 13B:
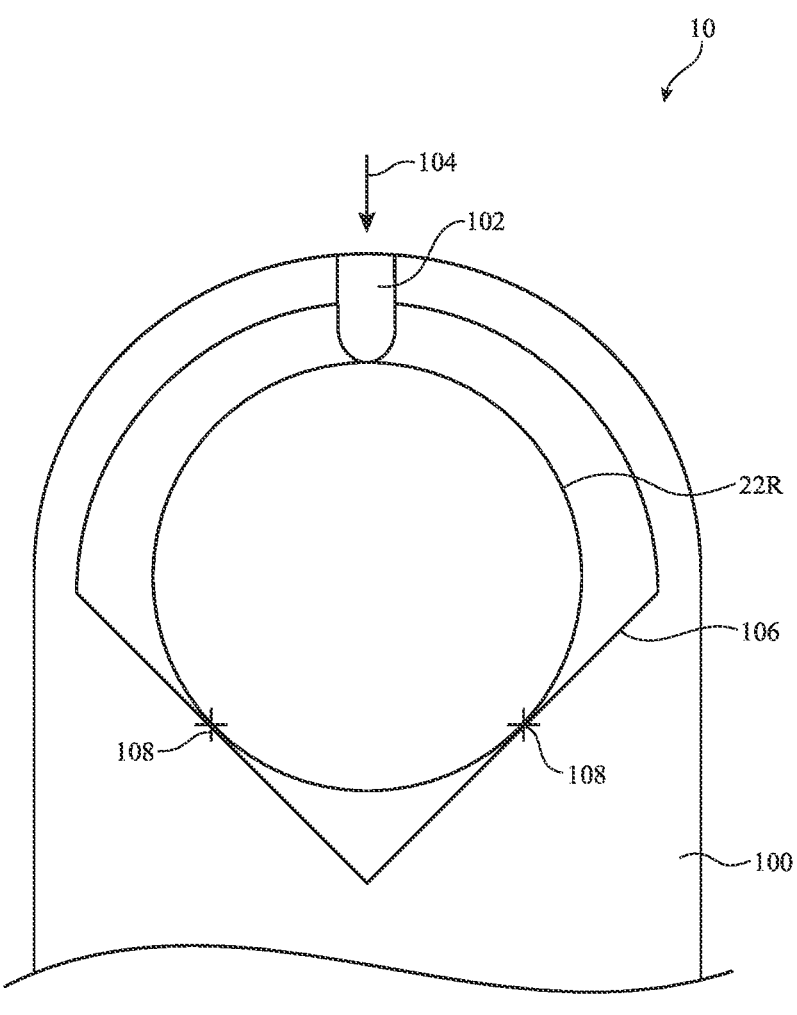

Device 10 may use guide rods to guide sliding structures. Springs may be used to bias the guide rods within the openings that receive the guide rods. Consider, as an example, the arrangement of FIG. 13A. As shown in FIG. 13A, device 10 may have a housing structure, a portion of an optical assembly, or other structure 100 that has an opening 106 that slidably receives a guide rod such as guide rod 22R. Biasing members such as springs 102 (e.g., leaf springs, spring-loaded pins, etc.) may be used to push against the surface of guide rod 22R in directions 104, thereby causing guide rod 22R to contact the inner surface of opening 106 at desired location 108. As shown in FIG. 13B, opening 106 may have a V-groove, so that there are contacts between guide rod 22R and structure 100 at two locations 108 when guide rod 22R is biased in direction 104 by spring 102. Arrangements of the type shown in FIGS. 13A and 13B help reduce uncertainty in the position of guide rod 22R relative to structure 100. Some or all of the guide rods in device 10 may use biasing arrangements such as these.

To help protect the privacy of users, any personal user information that is gathered by device 10 may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
a head-mounted housing;
optical assemblies in the head-mounted housing, wherein each optical assembly includes:
   a lens;
   a display that is configured to provide an image to an eye box through the lens;
   a support having a first portion and a second portion that move with respect to each other, wherein the lens and display are mounted in the second portion; and
   a face bumper mounted to the first portion; and
guide rods mounted to the head-mounted housing, wherein the first portion of each support is configured to slide along one of the guide rods relative to the head-mounted housing.

2. The head-mounted device defined in claim 1 wherein each optical assembly includes a motor configured to move the second portion with respect to the first portion and wherein when the second portion of that optical assembly moves with respect to the first portion of that optical assembly the lens of that optical assembly moves relative to the face bumper of that optical assembly.

3. The head-mounted device defined in claim 2 further comprising additional guide rods, wherein the second portion of each optical assembly is configured to slide along one of the additional guide rods relative to the first portion of each optical assembly.

4. The head-mounted device defined in claim 3 further comprising additional motors configured to slide the optical assemblies along the guide rods mounted to the head-mounted housing.

5. The head-mounted device defined in claim 4 wherein each face bumper has a curved surface configured to match a curved facial shape.

6. The head-mounted device defined in claim 4 further comprising springs configured to push against the guide rods.

7. The head-mounted device defined in claim 1 wherein the first portion of each support is configured to slide along one of the guide rods relative to the head-mounted housing to move the optical assemblies towards and away from each other to make interpupillary distance adjustments.

8. An optical assembly for a head-mounted device, comprising:
a lens;
a display configured to provide an image to an eye box through the lens;
a support for the lens and display, wherein the support has first and second portions that move relative to each other;
guide rods attached to the first portion, wherein the second portion is configured to slide along the guide rods relative to the first portion; and
springs configured to push against the guide rods.

9. The optical assembly defined in claim 8 further comprising face bumpers mounted to the first portion.

10. The optical assembly defined in claim 9 further comprising a motor, wherein the motor is configured to move the second portion relative to the first portion.

11. The optical assembly defined in claim 10 wherein the display and lens are mounted to the second portion.

12. The optical assembly defined in claim 11 wherein the second portion is configured to slide along the guide rods relative to the first portion as the motor moves the second portion relative to the first portion.

13. The optical assembly defined in claim 12 wherein the face bumpers have curved surfaces configured to match curved facial surfaces.

14. The optical assembly defined in claim 13 wherein the motor is configured to extend and retract the second portion relative to the first portion to make eye relief adjustments.

15. The optical assembly defined in claim 13 wherein the lens and the second portion to which the lens is mounted are configured to move relative to the first portion and relative to the face bumpers mounted to the first portion as the motor moves the second portion relative to the first portion.

16. A head-mounted device, comprising:
guide rods;
a head-mounted housing having a first portion and having a second portion that slides along the guide rods relative to the first portion, wherein the guide rods and the first portion of the head-mounted housing are in a wishbone arrangement; and
optical assemblies coupled to the second portion, wherein the optical assemblies each include a support configured to support a display and a lens through which an image from the display is provided to an eye box.

17. The head-mounted device defined in claim 16 further comprising a motor configured to move the second portion along the guide rods to adjust eye relief for the lenses of the optical assemblies.

18. The head-mounted device defined in claim 17 further comprising additional guide rods along which the optical assemblies slide towards and away from each other to make interpupillary distance adjustments.

\* \* \* \* \*